Aug. 3, 1937. W. R. POPE 2,088,721
INTERLOCKING OIL CONTROL
Filed March 5, 1936 2 Sheets-Sheet 1

Inventor
William R. Pope
By Wright, Brown, Quinby Mau
Attorneys

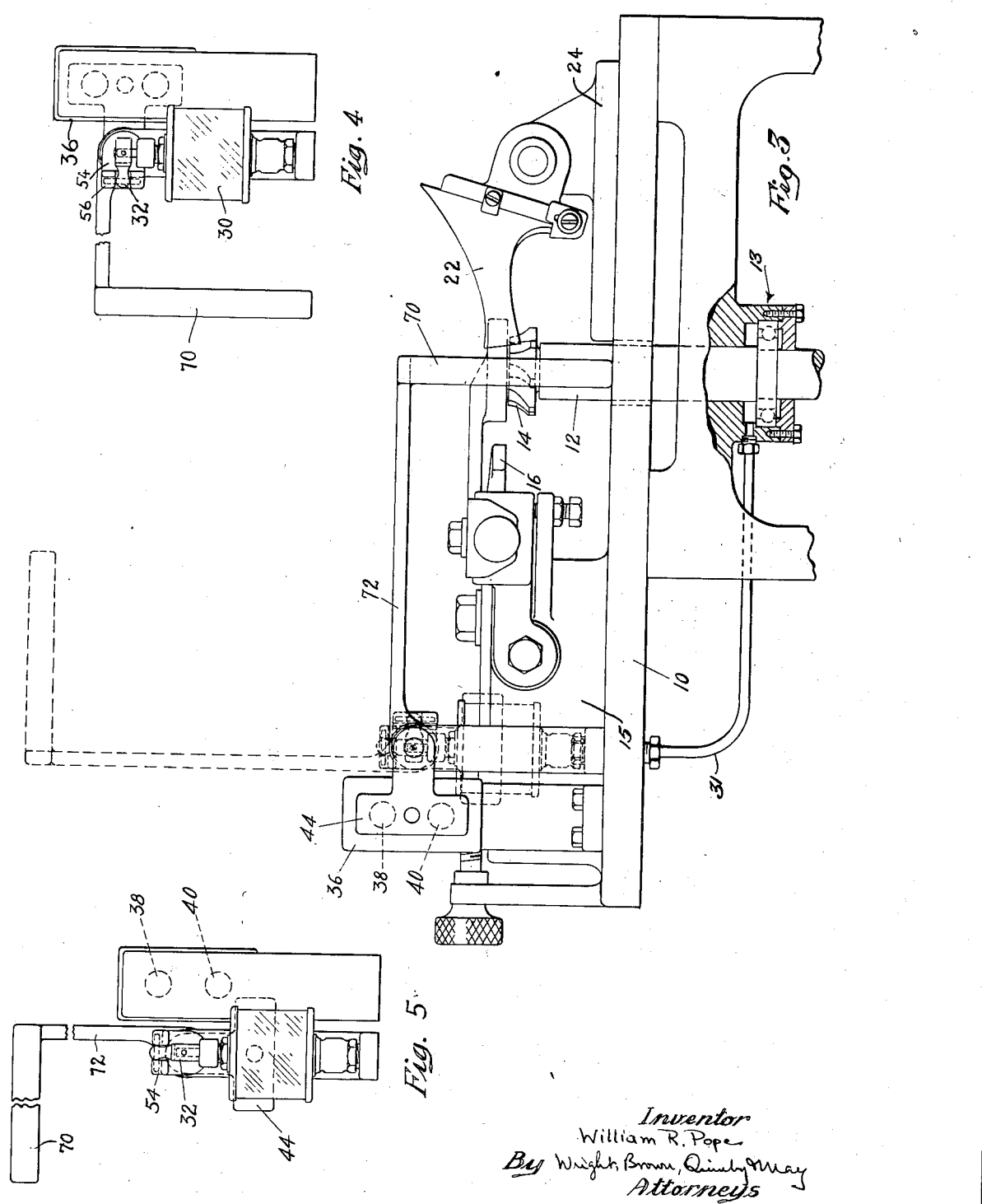

Patented Aug. 3, 1937

2,088,721

UNITED STATES PATENT OFFICE 2,088,721

INTERLOCKING OIL CONTROL

William R. Pope, Haverhill, Mass., assignor to Pope Machinery Corporation, Haverhill, Mass., a corporation of Massachusetts Application March 5, 1936, Serial No. 67,286

11 Claims. (Cl. 184—6)

This invention relates to oiling systems for high-speed bearings and more especially for high-speed ball bearings. Speeds are increasing from year to year until today commercial machines are offered in the wood-working field having spindles running at 20,000 R. P. M. In other fields even higher speeds are employed.

It has become well established that the major cause of the premature destruction of bearings is the starting up of the spindles before a supply of oil has reached the bearings. In many cases also, bearings are injured by the running of the machine for brief periods, as in machining sample pieces for example, without turning on the oil supply at all.

It is an object of this invention to provide means assuring that the oil supply will always be turned on before and during the use of a machine having high speed bearings. Another object of the invention is to provide a conspicuous signal to remind the operator to shut off the oil supply when the machine is shut down.

The most violent and rapid damage to bearings, and especially to ball bearings, from lack of oil occurs in vertical or nearly vertical spindles, due to the fact that the ball races, which act to some slight extent on horizontal spindles as oil reservoirs, are so arranged in vertical spindles as to spill out and drain off all of the oil, so that, with the light oil used and the heat accompanying these high speeds, the balls and ball races are usually bone dry after being shut down for an hour or more. The result of starting up and running bearings in this condition even for a few minutes without a fresh supply of oil is highly damaging to the bearings. The invention hereinafter described is exemplified in a machine for spooling heels, such machine including a high-speed vertical spindle. The invention, however, is not limited to this particular type of machine but is applicable generally to machines of all kinds which include a high-speed element.

These and other advantageous features of the invention will be apparent from the following description of a preferred embodiment of the invention shown in the drawings, in which Figure 1 is a plan view of a heel spooling machine including an embodiment of the invention.

Figure 3 is a side view of one side of the mechanism shown in Figure 1.

Figure 4 is an opposite side view of a portion of the mechanism shown in Figure 3.

Figure 5 is the same as Figure 4 except that it shows a different position of the movable parts.

Figures 1, 2:
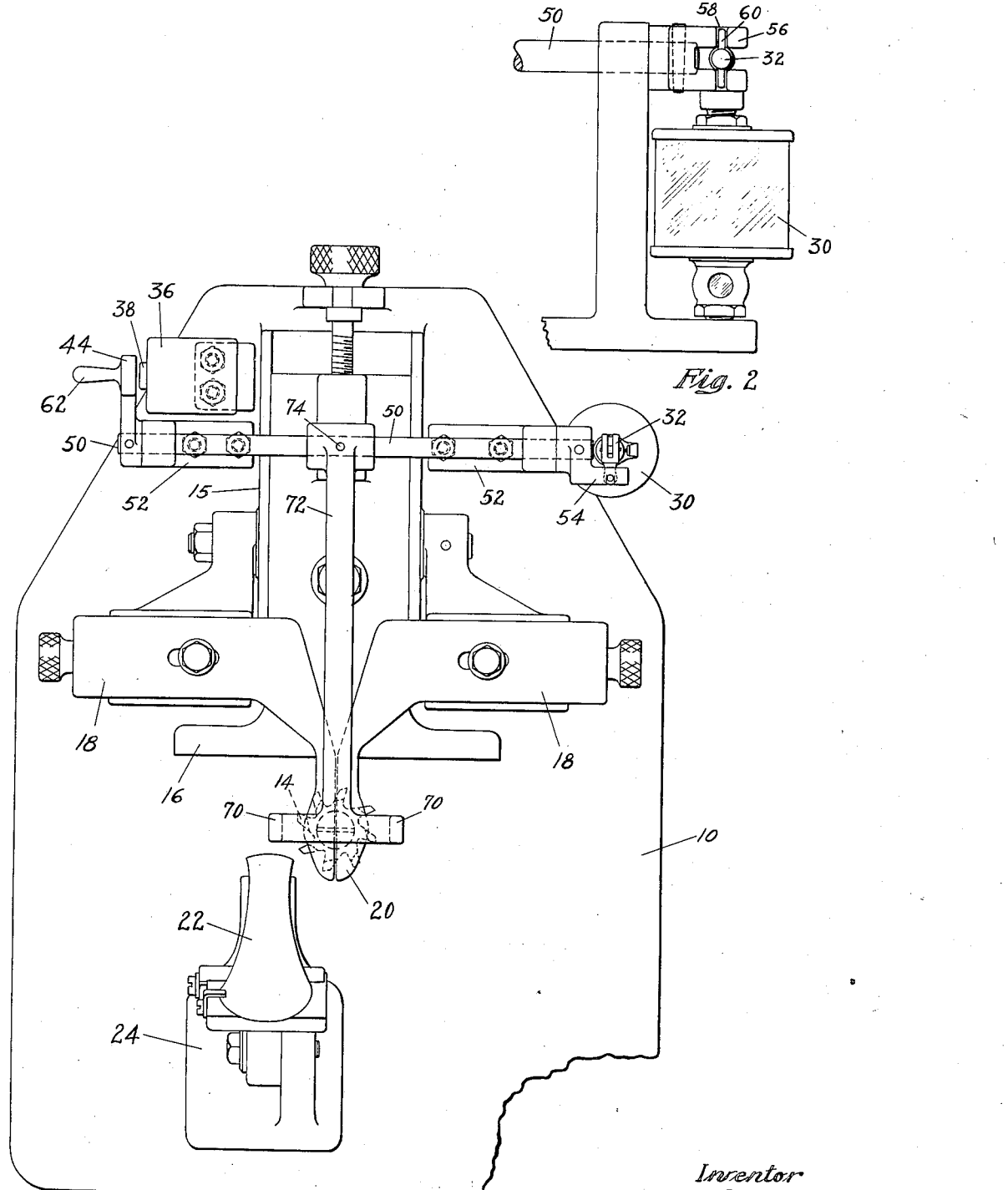
Figure 2 is a front view of the oil cup indicated in Figure 1.

The invention as illustrated on the drawings is shown as applied to the machine for spooling wood heels, but it is to be understood that the invention is capable of other applications and is not to be limited to any particular kind of machine. As shown, the spooling machine includes a flat table 10 through which projects vertically a spindle 12. The table 10 is provided with the customary frictionless bearing 13 for the spindle 12. On the upper end of this spindle is mounted a form cutter 14, the cutter being suitably spaced above the surface of the table 10. On the rear portion of the table is an elevated structure 15 on the top of which is adjustably supported a back stop 16 to limit the rearward movement of heels which are being spooled. Laterally adjustable on the elevated structure 15 are a pair of members 18 having forwardly projecting guide portions 20 which are immediately above the cutter 14 and which limit the approach of the heels to the cutter. The heel 22 which is to be spooled is suitably held on a jack 24, the jack being freely slidable on the smooth top of the table 10. In machines of this kind, the spindle 12 with the cutter 14 is preferably rotated at high speed so that it is important that the spindle bearings be properly lubricated at all times during the rotation of the spindle. Such lubrication may be provided through the instrumentality of an oil cup 30 or by any other suitable means for supplying an adequate oil feed. The oil cup illustrated is of well known and conventional structure as are the spindle bearings 13 and lubricating connections 31. The oil supply from the cup can be turned on and off by manipulating a control lever 32 in a manner well known in the art. When this lever is vertical, the oil supply is on. When the lever is horizontal, a valve (not shown) within the cup is closed, cutting off the supply of oil. In the ordinary operation of a machine of this type, a careless operator is liable to forget to turn off the oil when the machine is shut down. This wastes oil and floods the bearings. A far more serious trouble is the liability of an operator to start up the machine without first turning on the oil supply. This is liable to result in serious damage to the bearings. It is an object of the invention to make sure that the oil is properly turned on prior to the starting of the machine.

The spindle 12 is driven by any suitable motor or other means (not shown), such motor being controlled by a suitable switch, generally indicated at 36, for starting and stopping the same. The type of switch illustrated on the drawings is one which is frequently used on machines of this kind and which includes two buttons 38 and 40 which can be pressed respectively to start and stop the machine. According to the invention, an obstructing member 44 is mounted in such a manner as to cover the buttons 38 and 40 so as to prevent or to hinder access thereto when the obstruction 44 is in the position illustrated in Figures 1 and 3. The obstruction member 44 is operatively connected with means for operating the oil-control valve in the cup 30. To this end, the member 44 may be mounted on a shaft 50 which is rockable in bearings 52 on the table 10. As shown, the shaft 50 extends across the rear portion of the table to the vicinity of the oil cup 30. On the further end of the shaft 50 is mounted a suitable crank 54, having a forked end 56 embracing the oil-cup operating lever 32. The axis of the shaft 50 is substantially in line with the rocking axis of the lever 32, so that rotation of the shaft 50 through a quarter turn operates to rock the lever 32 from it horizontal position to its vertical position or the reverse. The forked crank member 56 may be slotted as at 58 to receive a pin 60 extending through the end portion of the lever 32 so as to secure the lever to the crank in such a manner as to allow sufficient play for the movements of the lever. As indicated on the drawings, the obstructing member 44 and the crank 54 are mounted on the shaft 50 in such angular relation that the member 44 covers the buttons 38 and 40 when the oil supply is turned off. This prevents accidental or thoughtless starting of the machine while the oil supply is turned off. In order to obtain access to the starting button 38 to start the machine, it is first necessary to swing the obstructing plate 44 out of the way. For this purpose, a convenient handle 62 may be provided. Movement of the obstructing plate 44 to its inactive position, as illustrated in Figure 5, automatically turns on the oil supply through the instrumentality of the crank 54. This gives the oil at least a brief interval in which to get started before the spindle 12 operates at full speed, since, after the oil is turned on, it is then necessary to press the starting button.

In spooling successive lots of heels of different shapes, it is frequently necessary to adjust the position of the stop 16 and the guides 20 in accordance with the size and shape of the next lot of heels to be spooled. According to the invention, a guard element is provided which hinders or obstructs the proper setting up or adjustment of the machine until the guard is removed. As shown, a guard member 70 is mounted in such a manner that the heel cannot be placed in operating position for the purpose of adjusting the stop 16 and guides 20. The guard 70 may be in the form of a fork-shaped member on the end of a rod 72 which is secured to the shaft 50 as by a pin 74. The guard 70 is so related to the plate 44 as to swing up from the table 10 as the plate 44 rocks to its inactive position, this rocking movement also being accompanied by the opening of the oil valve. Hence, the guard member 70 ensures that, during the setting up of the machine, the oil will have a chance to flow from the oil cup on the bearings, so that, when the machine is thereafter started, the bearings will have already received an initial supply of oil. As indicated in Figure 3, the forked guard 70, being at the end of an elongated rod 72, swings up into a conspicuous position when moved to its inactive position. These members thus serve as a conspicuous signal to the operator when the machine is shut down, reminding the operator to turn off the oil supply, this being automatically accomplished when the guard is swung down into its active position.

It is evident that various modifications and changes may be made in the particular embodiment of the invention herein shown and described without departing from the spirit or scope of the invention as defined in the following claims.

I claim:—

1. In a power-driven machine including a driven tool engageable by the work, means for lubricating said machine, means movable into and out of position to hinder access by the work to said tool, and interlocking means for automatically rendering the lubricating means operative when the hindering means is moved to inactive position and for rendering the lubricating means inoperative when the hindering means is moved into active position.

2. In a power-driven machine having a power-control device manually operable to start and stop the machine, means for supplying lubricant to said machine, a valve actuable to turn on and off the supply of said lubricant, a member movable into and out of a position for hindering access to said power-control device, a signal element, and means operably connecting said valve with said member and said element for simultaneous movement to open said valve, render said member inactive and operate said signal to attract the attention of the operator, and for reverse simultaneous movement to close said valve and to render said hindering member active.

3. In a power-driven machine including a driven tool engageable by the work, means for lubricating said machine, means movable between a position to hinder access by the work to said tool and a position to act as a signal to the operator, and connecting means for automatically rendering said lubricating means inoperative when said hindering means is moved to its hindering position and for rendering said lubricating means operative when said hindering means is moved to its signalling position.

4. In a power-driven machine having a power-control device operable to start and stop the machine, a tool engageable by the work, and means for lubricating said machine; means movable into and out of position for hindering access by the work to said tool, and means connected to said hindering means and operable by movement thereof into active position to prevent access to said power-control device and to render the lubricating means inoperative, said connected means being operable by movement of said hindering means to inactive position to render said power-control device accessible and to render said lubricating means operative.

5. In a power-driven machine having a power-control device manually operable to start and stop the machine and members adjustable to adapt the machine to different sizes or shapes to be operated on, means for supplying lubricant to said machine, and means hindering operation of said power-control device and proper adjustment of said members when said lubricant supply is turned off, said hindering means becoming inactive when the lubricant supply is turned on.

6. In a power-driven machine having a manually operable power-control device, a driven tool engageable by the work, and means for lubricating the machine; a combined guard and signal manually movable between a position in which it acts as a guard to hinder access by the work to said driven tool and a position in which it acts as a signal to the operator, and means connected to said guard and actuable thereby to render said power-control device inaccessible and said lubricating means inoperative when said guard moves into hindering position, and to render said power-control device accessible and said lubricating means operative when said guard moves into signaling position.

7. In a heel-spooling machine having a form cutter, means for driving said cutter and means for lubricating the machine; a device movable into and out of position to hinder access to said cutter by the work, and automatic interlocking means connected to said hindering means to render said lubricating means inoperative when the hindering means is moved into active position and to render said lubricating means operative when the hindering means is moved into inactive position.

8. In a heel-spooling machine having a form cutter, a bearing for said cutter, driving means for driving said cutter, a control device for said driving means, and lubricating means for lubricating said bearing; preventing means movable to and from a position to prevent access to said control device, hindering means movable between a position to hinder access by the work to said cutter and a position to act as a signal to the operator, and connecting means operatively connecting said hindering means to said preventing means and said lubricating means, said connecting means acting to render the lubricating means operative and preventing means inactive when the hindering means is moved to signalling position and to render the lubricating means inoperative and the preventing means active when the hindering means is moved to hindering position.

9. In a heel-spooling machine having a power-driven form cutter and means for lubricating said machine; means movable between a position to hinder access by the work to said cutter and a position to act as a signal to the operator, and means actuable by movement of said movable means to hindering position to render said lubricating means inoperative and actuable by movement of said hindering means to signalling position to render said lubricating means operative.

10. In a heel-spooling machine having a power-driven form cutter, a power-control device actuable to start and stop the machine, and means for lubricating the machine; means manually movable into and out of position for hindering access by the work to said cutter, and means connected to said hindering means and operable by movement thereof into active position to prevent access to said power-control device and to render said lubricating means inoperative, said connected means being operable by movement of said hindering means to inactive position to render said power-control device accessible and said lubricating means operative.

11. In a heel-spooling machine having a power-driven form cutter, a power-control device manually operable to start and stop the machine and an oil cup with a control valve, a member movable into and out of an active position in which it hinders access to said power-control device, an element movable to and from limiting positions in one of which it hinders operative access to said cutter and in the other of which it acts as a conspicuous signal to the operator, and means operatively connecting said member and element to said valve so that said member and element are in their access-hindering positions when said valve is closed and move out of said positions when the valve is opened.

WILLIAM R. POPE.